United States Patent
Chen et al.

(10) Patent No.: US 7,744,255 B2
(45) Date of Patent: *Jun. 29, 2010

(54) LIGHT-REFLECTING AND LIGHT-SHIELDING APPARATUS OF COMPUTER PANEL

(75) Inventors: Yun-Lung Chen, Taipei Hsien (TW); Yu-Ming Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 467 days.

This patent is subject to a terminal disclaimer.

(21) Appl. No.: 11/760,803

(22) Filed: Jun. 11, 2007

(65) Prior Publication Data

US 2008/0192491 A1 Aug. 14, 2008

(30) Foreign Application Priority Data

Feb. 8, 2007 (CN) .................... 2007 2 0200058 U

(51) Int. Cl.
*F21V 17/02* (2006.01)

(52) U.S. Cl. .................... 362/321; 362/319; 362/282

(58) Field of Classification Search ............. 362/384, 362/85, 89, 277, 282, 319, 321, 322, 323; 361/683, 816

See application file for complete search history.

(56) References Cited

U.S. PATENT DOCUMENTS

| 3,259,052 A | * | 7/1966 | Bradley et al. ............. 454/294 |
| 7,530,713 B2 | * | 5/2009 | Chen et al. .................. 362/277 |
| 7,530,714 B2 | * | 5/2009 | Chen et al. .................. 362/277 |

* cited by examiner

*Primary Examiner*—Sandra L O'Shea
*Assistant Examiner*—Danielle Allen
(74) *Attorney, Agent, or Firm*—Frank R. Niranjan

(57) ABSTRACT

A panel assembly includes a panel (13), a light-reflecting member (30) and a light-shielding board (50). The panel includes a light-pervious area. The light-reflecting member is coupled to the light-pervious area of the panel. The light-reflecting member forms a light-guiding wall (363) with a plurality of spaced slots (361) therein. The light-shielding board is positioned between the light-guiding wall and the light-pervious area. The light-shielding board defines a plurality of spaced slots (513) corresponding to the slots of the light-guiding wall, light-shielding bars (517) are formed between adjacent slots respectively. The light-shielding board is slidable to cause the slots of the light-shielding board to be removed from the corresponding slots of the light-reflecting member and the light-shielding bars of the light-shielding board to cover the corresponding slots of the light-reflecting member, to thereby shield the light reflected from the light-reflecting member from passing through the light-pervious area.

21 Claims, 4 Drawing Sheets

LIGHT-REFLECTING AND LIGHT-SHIELDING APPARATUS OF COMPUTER PANEL

BACKGROUND OF THE INVENTION

1. Field of the Invention

The present invention relates to front panels of computer systems, and more particularly to a front panel of a computer system with a light-reflecting and light-shielding member.

2. Description of Related Art

Usually, a light source, such as a light-emitting diode, is installed on a front panel of a computer system, in order to indicate the working state of the computer system. Generally, a light-pervious switch button is positioned on the front panel. When the switch button is pushed to press an electrical switch, the power supply switches on and the light source emits light, and the switch button is illuminated. However, in conventional computer systems, one light source corresponds to only one switch button. If another switch button or light-pervious member needs illumination, additional light-emitting diodes should be provided. In addition, the light-emitting diode as a spot light source, lights only a limited area.

Another conventional apparatus is provided for illuminating light-pervious members and enlarging the lit area of the light source, which includes a light-reflecting member mounted on a computer panel. The light-reflecting member includes a light incident surface, a light-guiding portion, and a light-showing portion. A bracket is disposed above the light incident surface for receiving a light source. Rays emitted by the light source are reflected by the light-guiding portion, and illuminate a larger area of the computer panel via the light-showing portion. However, the light of the computer panel cannot be shielded when users don't want to see the light while the computer is running.

What is needed, therefore, is a front panel of a computer system with a light-reflecting and light-shielding apparatus selectively allowing a larger area of the computer panel to be lit or the light to be shielded when so desired.

SUMMARY OF THE INVENTION

A panel assembly includes a panel, a light-reflecting member and a light-shielding board. The panel includes a light-pervious area. The light-reflecting member is coupled to the light-pervious area of the panel configured for reflecting light from a light source to the light-pervious area. The light-reflecting member forms a light-guiding wall with a plurality of spaced slots therein. The light-shielding board is slidably positioned between the light-guiding wall and the light-pervious area. The light-shielding board defines a plurality of spaced slots corresponding to the slots of the light-guiding wall for allowing the light passing through the light-pervious area when the slots of the light-shielding board align with the slots of the light-guiding wall respectively, light-shielding bars are formed between adjacent slots respectively. The light-shielding board is slidable along the light-reflecting member to cause the slots of the light-shielding board to be removed from the corresponding slots of the light-reflecting member and the light-shielding bars of the light-shielding board to cover the corresponding slots of the light-reflecting member, to thereby shield the light reflected from the light-reflecting member from passing through the light-pervious area.

Other advantages and novel features of the present invention will become more apparent from the following detailed description of a preferred embodiment when taken in conjunction with the accompanying drawings, in which:

DETAILED DESCRIPTION OF THE INVENTION

Figure 1:
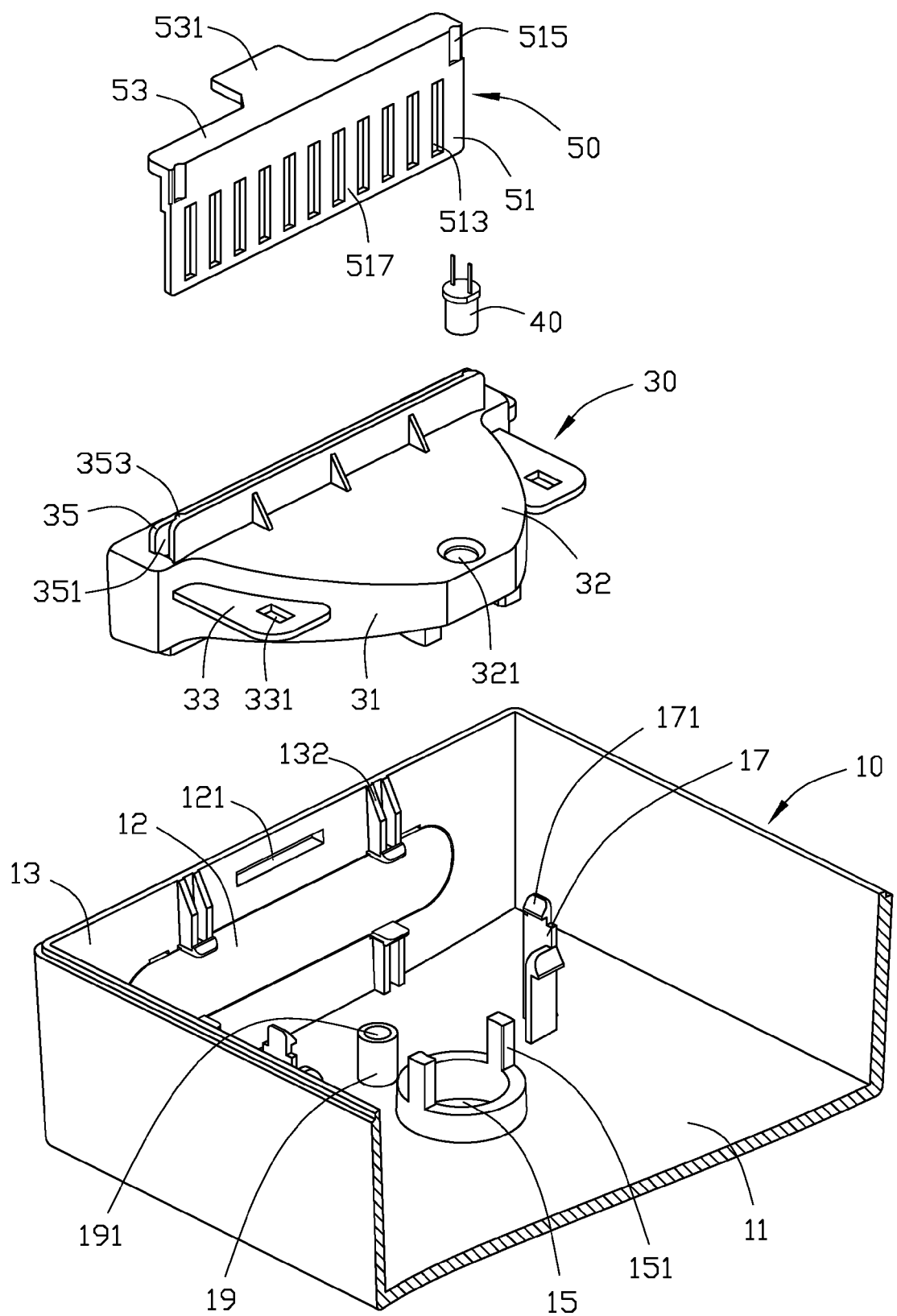
FIG. 1 is an exploded, isometric view of a panel with a light-reflecting and light-shielding apparatus in accordance with a preferred embodiment of the present invention including a panel, a light-reflecting member, a light-shielding board, and a light source.

Referring to FIG. 1, a light-reflecting and light-shielding apparatus of an embodiment of the present invention includes a computer enclosure 10, a light-reflecting member 30, and a light-shielding board 50.

The computer enclosure 10 includes a base panel 11 and a side panel 13 generally perpendicular to the base panel 11. A round receiving hole 15 is defined in the inner surface of the base panel 11 for a power button (not shown) disposed therein. Two positioning posts 151 are respectively formed at opposite sides of the receiving hole 15. A pair of resilient hooks 17 protrudes from the base panel 11 between the side panel 13 and the receiving hole 15. Each resilient hook 17 includes a clasp 171 protruding from a free end of the resilient hook 17. A fixing post 19 with a fixing hole 191 defined therein protrudes from the base panel 11 between the pair of resilient hooks 17. A light-pervious area is defined in the center of the side panel 13 for fitting a light-pervious board 12 into the area. A rectangular slot 121 is defined in the side panel 13 at a side of the light-pervious area. A plurality of locating tabs 132 is formed on an inside of the side panel 13.

Figure 2:
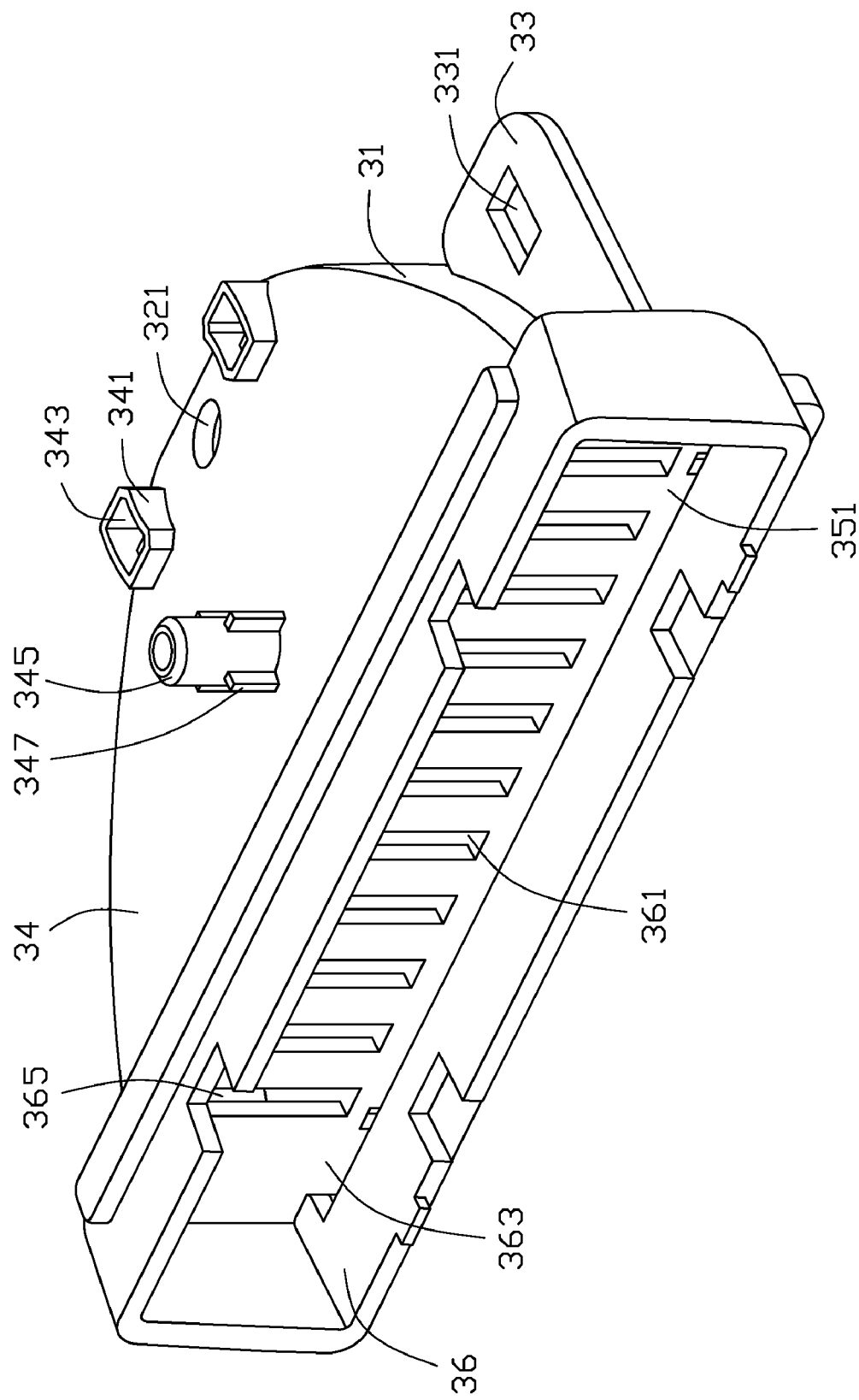
FIG. 2 is an enlarged isometric view of the light-reflecting member of FIG. 1, but viewed from another aspect.

Referring to FIGS. 1 and 2, the light-reflecting member 30 is configured to be disposed on an inner surface of the computer enclosure 10, for reflecting light of a light source 40, and enlarging an illuminated area. The light source 40 may be a light-emitting diode. The light-reflecting member 30 has a hollow body 31 including a semicircular top wall 32 and a semicircular bottom wall 34 parallel to the top wall 32. A rectangular light-pervious portion 36 is defined at a straight side of the body 31 corresponding to the light-pervious board 12 on the enclosure 10. A light-guiding wall 363 having a plurality of rectangular slots 361 defined along a lengthways direction is formed in the inner side of the light-pervious portion 36 for light passing through. A length of each slot 361 is substantially equal to a width of the light-pervious portion 36. The rectangular light-pervious portion 36 defines a plurality of cutouts 365 corresponding the locating tabs 132 of the side panel 13. A pair of extending clips 33 protrudes from opposite sides of the body 31 respectively. Each extending clip 33 defines a locking hole 331 therein, for receiving the corresponding clasp 171 of the resilient hook 17. A mounting pole 345 having a plurality of supporting members 347 extending therearound, protrudes down from the bottom wall 34 of the light-reflecting member 30, for engaging into the fixing hole 191 of the fixing post 19 of the computer enclosure 10. A pair of securing portions 341 is formed at the bottom wall 34 of the light-reflecting member 30, and each securing portion 341 defines a securing slot 343 therein, for receiving the corresponding positioning post 151. A through hole 321 is defined between the securing portions 341, and through the top wall 32 and the bottom wall 34 thereof, for accommodating the light source 40. A pair of parallel sidewalls 35 perpendicularly extends up from the top wall 32. A receiving slot 351 is defined between two sidewalls 35, and extends through the top wall 32 to the inner of the body 31, for receiving the light-shielding board 50. A pair of protrusions 353 is formed near opposite ends of one side of one sidewall 35 toward another sidewall 35 for securing the light-shielding board 50.

The light-shielding board 50 includes a rectangular plate 51 received in the receiving slot 351 of the light-reflecting member 30, and a bent flange 53 generally perpendicular to the plate 51. An operating handle 531 extends from the middle of the bent flange 53 horizontally, for extending through the rectangular slot 121 of the computer enclosure 10. A pair of recesses 515 is defined at opposite ends on one side of the plate 51, corresponding to the protrusions 353 of the light-reflecting member 30. A plurality of rectangular slots 513 is formed on the plate 51, under the recesses 515, corresponding to the slots 361 of the light-reflecting member 30. A size of each slot 513 is substantially equal to a size of the slot 361. A light-shielding bar 517 is formed between every two adjacent slots 513, for blocking each slot 361 of the light-reflecting member 30. A length of the plate 51 is less than that of the receiving slot 351, and a length of the operating handle 531 is less than that of the rectangular slot 121, so that the plate 51 can slide in the receiving slot 351 of the light-reflecting member 30 via sliding of the operating handle 531 in the rectangular slot 121. A space between centers of two adjacent slots 513 is the same as that between centers of two adjacent slots 361, thereby the light-shielding board 50 can block the light-guiding wall 363 of the light-reflecting member 30 and each light-shielding bar 517 can block the corresponding slot 361 when the light-shielding board 50 slides in the receiving slot 351 of the light-reflecting member 30 from one side to another side.

Figure 3:
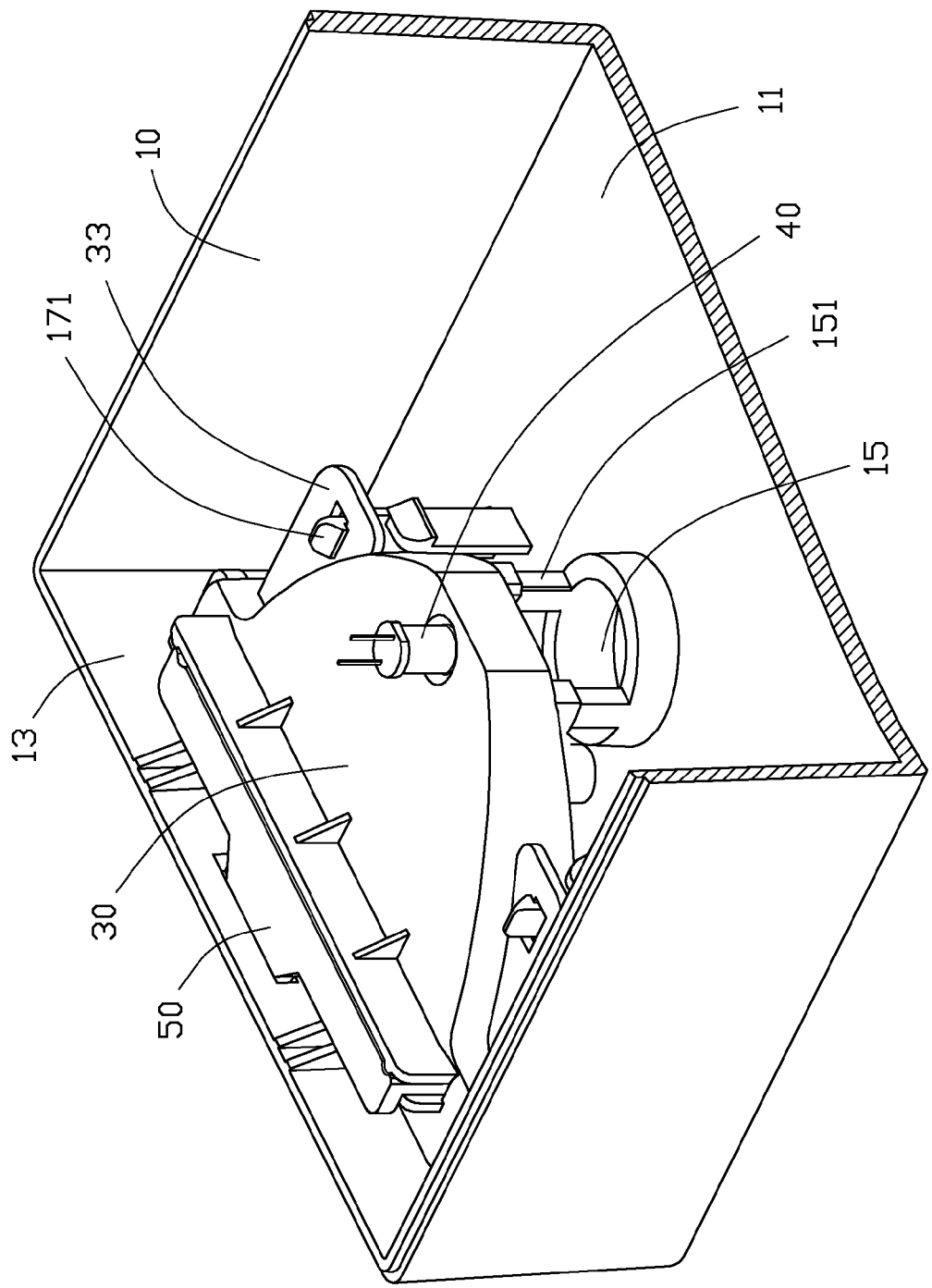
FIG. 3 is an assembled view of the panel with the light-reflecting and light-shielding apparatus of FIG. 1.
Figure 4:
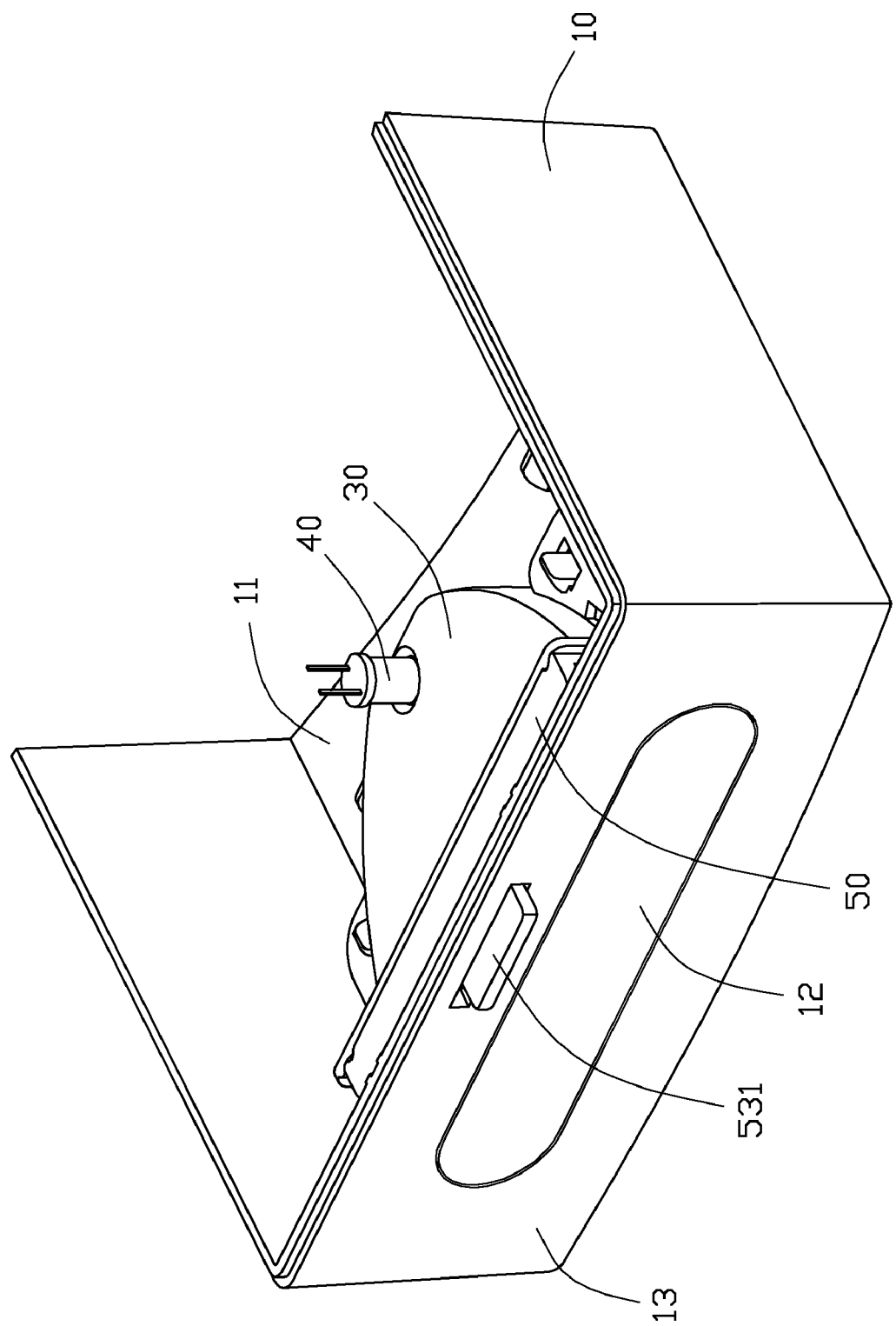
FIG. 4 is an assembled view of the panel with the light-reflecting and light-shielding apparatus of FIG. 1, but viewed from another aspect.

Referring also to FIGS. 3 and 4, in assembly, the light-reflecting member 30 is attached to the enclosure 10 with the locating tabs 132 received in the respective cutouts 365. The light-pervious portion 36 is adjacent to the light-pervious board 12 on the side panel 13 and the operating handle 531 is inserted into the rectangular slot 121. The light-reflecting member 30 is pushed toward the base panel 11, until the positioning posts 151 are inserted into the securing slots 343 of the securing portions 341, and the corresponding clasps 171 of the resilient hooks 17 are inserted through the locking holes 331 of the extending clips 33. At this time, the mounting pole 345 is inserted into the fixing hole 191 of the fixing post 19, and the supporting members 347 are seated on the top edge of the fixing post 19. The light-reflecting member 30 is thus secured on the computer enclosure 10. The light source 40 is positioned in the through hole 321, and electrically connects with the computer for receiving power. The plate 51 of the light-shielding board 50 is inserted into the receiving slot 351, and the operating handle 531 extends through the slot 121 of the computer enclosure 10 to expose to outside of the enclosure 10. One of the protrusions 353 is fitted in the corresponding recess 515, thereby the light-shielding board 50 is secured in the light-reflecting member 30.

In use, when the computer is turned on, the light source 40 emits light. If users want the light to illuminate the light-pervious board 12, the protrusion 353 at one side is fixed in the corresponding recess 515 to secure the light-shielding board 50 to one side of the receiving slot 351 by pulling the operating handle 531. The slots 513 of the light-shielding board 50 are in alignment with the corresponding slots 361 of the light-reflecting member 30, thereby the light emitted by the light source 40 transmits through the light-pervious board 12 via the slots 361 of the light-pervious portion 36 and the slots 513 of the light-shielding board 50. If users don't want the light-pervious board 12 to be illuminated, the operating handle 531 is pulled to move the light-shielding board 50 to another side of the receiving slot 351 so as to fix the protrusion 353 at the other side in the corresponding recess 515. The light-shielding bars 517 of the light-shielding board 50 block the corresponding slots 361 of the light-reflecting member 30, and the light-shielding board 50 blocks the light-guiding wall 363 of the light-reflecting member 30. Thereby the light-pervious board 12 is shielded from the light.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A panel assembly comprising:
   a panel having a light-pervious area;
   a light-reflecting member coupled to the light-pervious area of the panel configured for reflecting light from a light source to the light-pervious area, the light-reflecting member forming a light-guiding wall with a plurality of spaced slots therein; and
   a light-shielding board slidably positioned between the light-guiding wall and the light-pervious area, the light-shielding board defining a plurality of spaced slots corresponding to the slots of the light-guiding wall for allowing the light passing through the light-pervious area when the slots of the light-shielding board align with the slots of the light-guiding wall respectively, light-shielding bars being formed between adjacent slots respectively;
   wherein the light-shielding board is slidable along the light-reflecting member to cause the slots of the light-shielding board to be removed from the corresponding slots of the light-reflecting member and the light-shielding bars of the light-shielding board to cover the corresponding slots of the light-reflecting member, to thereby shield the light reflected from the light-reflecting member from passing through the light-pervious area.

2. The panel assembly as described in claim 1, wherein the slots of the light-reflecting member and the slots of the light-shielding board array in parallel along a lengthways direction of the light-pervious area, and a size of each light-shielding bar is larger than or equal to a size of the corresponding slot of the light-reflecting member, a space between centers of two adjacent slots of the light-shielding board is equal to that between centers of the corresponding two adjacent slots of the light-reflecting member.

3. The panel assembly as described in claim 1, wherein the light-shielding board comprises a plate parallel to the panel, and a bent flange perpendicular to the plate, the slots being defined in the plate.

4. The panel assembly as described in claim 3, wherein an operating handle extends from the middle of the bent flange horizontally, the panel defines a slot for the operating handle extending through.

5. The panel assembly as described in claim 1, wherein the light-reflecting member comprises a top wall, a pair of sidewalls extending up from the top wall perpendicularly, a receiving slot being formed between two sidewalls and extending through the top wall into an inner area of the light-reflecting member for receiving the light-shielding board.

6. The panel assembly as described in claim 5, wherein a pair of recesses is defined at opposite ends of one side of the light-shielding board, a pair of protrusions is formed on one sidewall of the light-reflecting member corresponding to the pair of recesses, the distance between the recesses is unequal to that between the protrusions, when the slots of the light-shielding board align with the respective slots of the light-reflecting member, one of the pair of protrusions at one side is fixed in the corresponding recess to secure the light-shielding board to one side of the light-reflecting member, and when the slots of the light-shielding board are removed from the respective slots of the light-reflecting member, the other of the pair of protrusions at the other side is fixed in the corresponding recess to secure the light-shielding board to the other side of the light-reflecting member.

7. The panel assembly as described in claim 1, further comprising another panel perpendicular to the panel, wherein the light-reflecting member is detachably mounted to the another panel.

8. The panel assembly as described in claim 7, wherein a fixing post with a fixing hole defined therein is formed in the another panel, the light-reflecting member comprises a bottom wall opposite to the top wall, a mounting pole protruding down from the bottom wall and engaging into the fixing hole of the fixing post.

9. The panel assembly as described in claim 1, wherein a light-pervious portion is defined at a side of the light-reflecting member corresponding to the light-pervious area, the light-pervious wall is formed in the inner side of the light-pervious portion.

10. A panel assembly comprising:
a panel comprising a light-pervious area;
a light-reflecting member having a plurality of spaced slots defined therein configured for reflecting light to the light-pervious area through the slots; and
a light-shielding board received in the light-reflecting member, the light-shielding board defining a plurality of spaced slots thereon corresponding to the slots of the light-reflecting member;
wherein the slots of the light-reflecting member are revealed via the slots of the light-shielding board when the light-shielding board is fixedly positioned at one side of the light-reflecting member, and each slot of the light-reflecting member is blocked by the light-shielding board when the light-shielding board is slid to a distance to be fixedly positioned at another side of the light-reflecting member.

11. The panel assembly as claimed in claim 10, wherein the light-reflecting member comprises a light-pervious portion having a light-pervious wall formed in the inner side thereof, the slots being defined in the light-pervious wall.

12. The panel assembly as claimed in claim 10, wherein a light-shielding bar is formed between each two adjacent slots of the light-shielding board respectively, and the light-shielding bars shield the corresponding slots of the light-reflecting member when the light-shielding board is fixedly positioned at another side of the light-reflecting member.

13. The panel assembly as claimed in claim 12, wherein the slots of the light-reflecting member and the slots of the light-shielding board are arrayed in parallel along a lengthways direction of the light-pervious area, a space between centers of two adjacent slots of the light-shielding board is equal to that between centers of the corresponding two adjacent slots of the light-reflecting member.

14. The panel assembly as claimed in claim 10, wherein the light-shielding board comprises a plate parallel to the panel, and a bent flange perpendicular to the plate, the slots being defined on the plate.

15. The panel assembly as claimed in claim 14, wherein an operating handle extends from the middle of the bent flange horizontally, the panel defines a slot for the operating handle extending through.

16. The panel assembly as claimed in claim 10, wherein the light-reflecting member comprises a top wall, a pair of sidewalls extending up from the top wall perpendicularly, a receiving slot being formed between two sidewalls and extending through the top wall into an inner area of the light-reflecting member for receiving the light-shielding board.

17. The panel assembly as claimed in claim 16, wherein a pair of recesses is defined at opposite ends of one side of the light-shielding board, a pair of protrusions is formed on one sidewall of the light-reflecting member corresponding to the pair of recesses, the distance between the recesses is unequal to that between the protrusions, when the slots of the light-shielding board align with the respective slots of the light-reflecting member, one of the pair of protrusions at one side is fixed in the corresponding recess to secure the light-shielding board to one side of the light-reflecting member, and when the slots of the light-shielding board are removed from the respective slots of the light-reflecting member, the other of the pair of protrusions at the other side is fixed in the corresponding recess to secure the light-shielding board to the other side of the light-reflecting member.

18. The panel assembly as claimed in claim 10, further comprising another panel perpendicular to the panel, wherein the light-reflecting member is detachably mounted to the another panel.

19. The panel assembly as described in claim 18, wherein a fixing post with a fixing hole defined therein is formed in the another panel, the light-reflecting member comprises a bottom wall opposite to the top wall, a mounting pole protruding down from the bottom wall and engaging into the fixing hole of the fixing post.

20. A panel assembly comprising:
a pair of panels perpendicular to each other, one panel defining a light-pervious area, the other panel comprising a mounting structure formed therein;
a light-reflecting member attached to the other panel via the mounting structure, the light-reflecting member comprising a light-guiding wall defining therein a plurality of spaced slots facing the light-pervious area, and a light-reflecting wall configured for reflecting light from a light source to the light-pervious area through the slots; and
a light-shielding board slidably positioned between the light-guiding wall and the light-pervious area and being operable from outside of the panel, the light-shielding board comprising a plurality of spaced slots corresponding to the slots of the light-reflecting member, and a plurality of light-shielding bars each adjacent a corresponding slot thereof;
wherein the light-shielding board is slidable relative to the panel between a first position where the slots of the light-reflecting member are aligned with the respective slots of the light-shielding board such that the light reflected from the light-reflecting member is capable of passing through the slots of the light-guiding wall and the light-shielding board to the light-pervious area, and a second position where the slots of the light-reflecting member are shielded by the respective light-shielding bars such that the light reflected from the light-reflecting member is blocked by the light-shielding bars from transmitting to the light-pervious area.

21. The panel assembly as described in claim 20, wherein a pair of complemental engaging structures is formed between the light-shielding board and the light-reflecting member, the light-shielding board is securely engaged with the light-reflecting member via one of the complemental engaging structures at the first position and is securely engaged with the light-reflecting member via the other one of the complemental engaging structures at the second position.

* * * * *